United States Patent Office 3,421,815
Patented Jan. 14, 1969

3,421,815
STRUCTURE FOR AUTOMATICALLY
FOCUSING A PROJECTOR
Dieter Dönitz, Braunschweig, Germany, assignor to Voigtlander A.G., Braunschweig, Germany, a corporation of Germany
Filed Feb. 28, 1966, Ser. No. 530,720
Claims priority, application Germany, Apr. 6, 1965,
V 28,215
U.S. Cl. 353—99                           9 Claims
Int. Cl. G03b 21/28; G03b 3/00; G03b 27/34

ABSTRACT OF THE DISCLOSURE

Automatic focusing arrangement for a photographic projector wherein a radiation source provides diverging beams of radiation and first optical elements in the path of the latter bring the beams into coincidence in the focal plane of the objective. The beams are reflected back along the original paths by a slide which is in a projection plane when the projection plane and the focal plane coincide. The radiation beams are reflected by the slide along a first return path when the projection plane is between the focal plane and the objective and along a second return path when the focal plane is between the projection plane and the objective. A pair of beam receiving elements and a pair of additional optical elements are respectively located at the first of the return paths for directing the reflected beams specifically to the beam receiving elements. When the planes are out of coincidence in one direction, one of the beam receiving elements will receive a reflected beam, and when the planes are out of coincidence in an opposite direction the other of the beam receiving elements will receive the reflected beam. When the planes are in coincidence there will be no beam reflected to either of the pair of beam receiving elements. An adjusting device responds to that one of the beam receiving elements which receives a reflected beam to bring the planes into coincidence for automatically focusing the projector.

---

Figure 1:
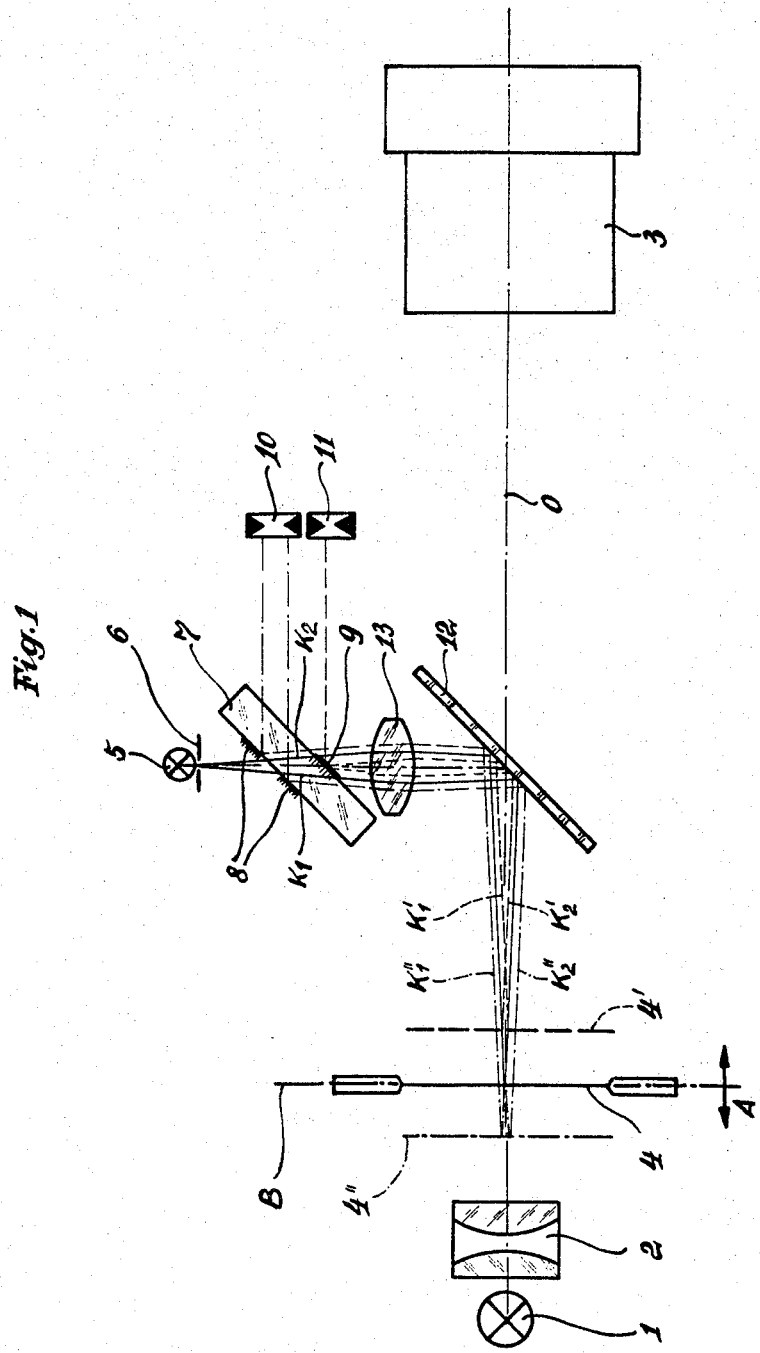

The present invention relates to photographic projectors.

In particular, the present invention relates to structures for automatically focusing photographic projectors.

In conventional structures for automatically focusing a photographic projector, a beam of radiation having properties different from the light beam which is used to project the photographic image is reflected from the slide and the reflected beam is partially directed to one radiation receiver while the remainder of the reflected beam is received by another radiation receiver. Various structures are known for deflecting part of the reflected beam of radiation in this way. When the slide is situated precisely in the focal plane of the objective, the pair of radiation receivers will not carry out any adjustments. However, when the slide is not positioned in the focal plane then the portions of the reflected beam of radiation received by the pair of radiation receivers will automatically actuate an adjusting device which will automatically focus the projector.

These known structures suffer from several disadvantages. In the first place the radiation receivers continuously receive radiation so that they can only detect improper focusing by a change in the received radiation, and this requirement involves highly sensitive and extremely complex radiation receivers which are expensive and give rise to faulty, inaccurate operation. Moreover, with these known structures it is necessary for part of the automatic focusing structure to be situated on one side of the optical axis and another part to be situated on the other side of the optical axis, so that an undesirably large amount of space is required for the automatic focusing structure, and it is therefore not possible to provide with these structures projectors of desired compactness.

It is a primary object of the present invention to provide for a photographic projector an automatic focusing structure which will avoid the above drawbacks of the conventional automatic focusing apparatus.

Thus, it is one of the primary objects of the present invention to provide an arrangement wherein beam receivers will receive no radiation when the projector is properly focused, so that the beam receivers whenever they receive any radiation will actuate an automatic adjusting structure. In this way it is possible to operate with a very high degree of accuracy while using far less sensitive and far less expensive radiation receivers which are capable of operating very reliably.

Furthermore, it is an object of the invention to provide a construction in which practically the entire automatic focusing structure can be conveniently situated on one side of the optical axis, so that in this way an extremely compact assembly can be provided.

In addition, it is an object of the invention to provide a structure composed of relatively simple rugged elements which are very reliable in operation.

The projector of the invention includes an objective means which is capable of projecting a sharp image when the projection plane, in which a slide is situated, coincides with the focal plane of the objective means. The structure of the invention includes a radiation beam producing means which provides a pair of diverging beams of radiation which diverge with respect to each other at relatively sharp, acute angle. A first optical means receives the diverging beams of radiation and brings them into coincidence at the focal plane of the objective. When this latter focal plane is in coincidence with the projection plane, then the beams of radiation which coincide at the focal plane will be reflected by the slide itself back along their original paths. However, when the project plane is situated between the focal plane and the objective means a slide at the projection plane will reflect the beams of radiation back along a first return path while when the focal plane is between the projection plane and the objective means the slide will reflect the beams of radiation back along a second return path. The structure of the invention includes a pair of radiation receiving means and a pair of additional optical means respectively situated along the return paths for directing the reflected beams of radiation respectively to the pair of radiation receiving means, so that one of these radiation receiving means will receive a reflected beams of radiation when the projection plane is between the focal plane and the objective means while the other of the radiation receiving means will receive a reflected beam of radiation when the focal plane is between the projection plane and the objective means. Neither one of the radiation receiving means will receive any reflected beam when these planes are in coincidence. Therefore, it is only when one or the other of the radiation receiving means receives a reflected beam of radiation that the structure of the invention detects lack of proper focusing of the projector. An adjusting means is operatively connected with the pair of radiation receiving means to respond to whichever one thereof receives a reflected beam of radiation for bringing the planes back into coincidence so as to automatically focus the projector.

Figure 2:
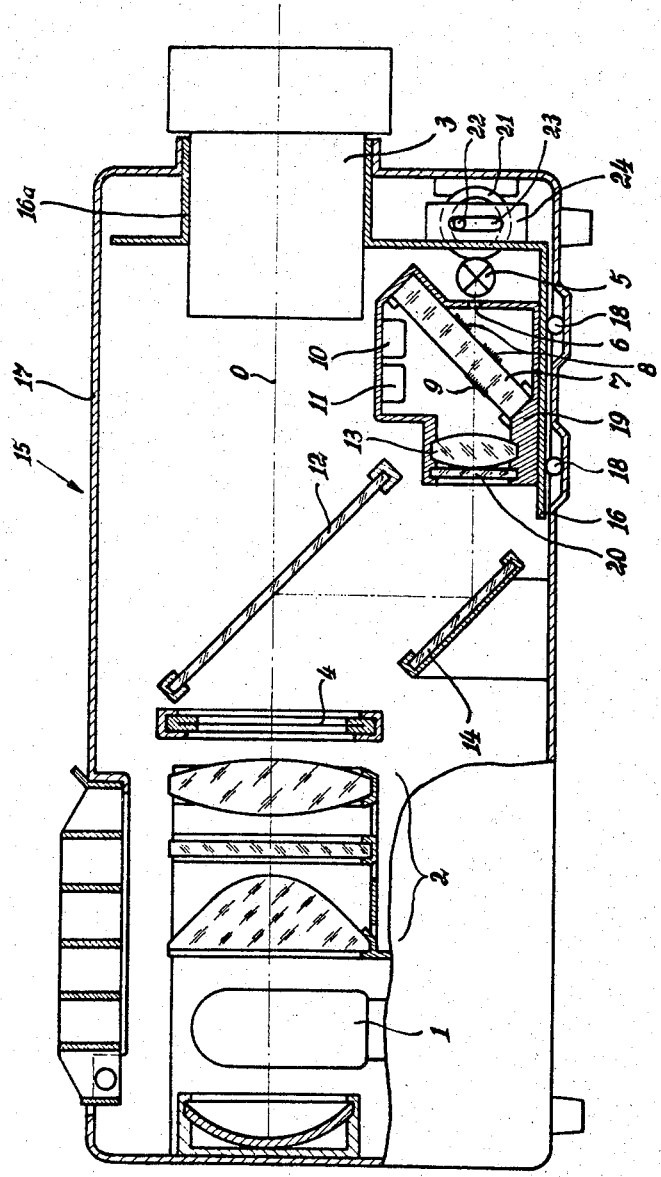
Figure 3:
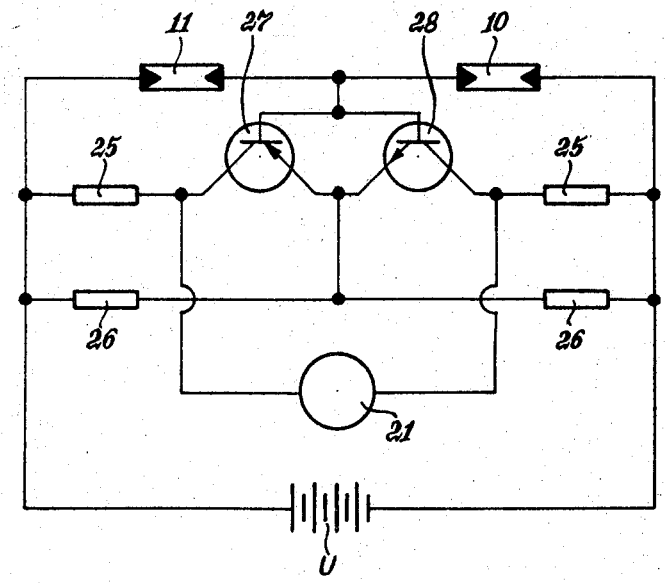

The invention is illustrated by way of example in the accompanying drawings which form part of the application and in which:

FIG. 1 is a schematic illustration of one possible embodiment of a structure according to the present invention;

FIG. 2 indicates in a longitudinal sectional partly schematic view how structure according to the principle of FIG. 1 is incorporated into an actual projector; and FIG. 3 is an illustration of one possible wiring diagram of an electrical structure used in conjunction with the invention.

Referring now to FIG. 1, the photographic projector structure illustrated therein includes a projection lamp 1 situated behind a conventional condenser lens assembly 2. The lamp 1 and the condenser lens assembly 2 are situated along the optical axis of an objective means 3 which is longitudinally adjustable along its optical axis O indicated in a dot-dash line. One of the focal planes B of the objective 3 is situated also in a dot-dash line. The adjustment is of course carried out in such a way that the other, unillustrated focal plane of the objective means 3 coincides with the unillustrated projection screen or the like which receives the projected image.

A slide 4 is situated at the projection plane of the projector in an unillustrated slide-carrier which in the example illustrated in FIG. 1 is adjustable along the optical axis as indicated by the double-headed arrow A, and the structure for adjusting the slide-carrier along the optical axis also is not illustrated in FIG. 1.

Situated above the optical axis O is a radiation beam producing means which includes a source of radiation 5 and a plate 6 which is opaque and which is formed with a gap in the form of an elongated slit through which the beam of radiation from the source 5 travels. Beneath the gap or slit of the plate 6 is a plate 7 through which the radiation is capable of freely passing. For example in the case where the radiation is light, such as infra-red light, the plate 7 is simply a transparent plate through which the light can freely pass. The plate 7 has a pair of opposed flat parallel faces which are respectively situated in planes which make an angle of 45° with respect to the optical axis O.

A pair of optical means are respectively carried by the opposed flat, parallel faces of the plate 7. One of these optical means is formed by a pair of outer reflectors 8 in the form of suitably mirrored surface portions of the plate 7 which have upwardly directed opaque surfaces directed toward the source 5 and opposed reflecting surfaces directed away from the source 5. Thus, these surfaces of the reflectors 8 which are directed away from the source 5 are suitably mirrored and attached to the upper face of the plate 7, as viewed in FIG. 1. The lower flat face of the plate 7, which is directed away from the source 5, is provided with the optical means 9 in the form of an additional mirrored surface portion having a downwardly directed reflecting face and an upper opaque face. Thus, in the case of the reflector 9 the opaque side thereof also is directed toward the source 5 while the reflecting side thereof is directed away from the source 5. As is apparent from FIG. 1 the optical means 9 is situated directly in line with the gap or slit of the opaque plate 6 while the reflectors 8 are situated on opposite sides of this slit. As a result the beam of radiation issuing from the source 5, after traveling through the slit of the plate 6, will pass between the pair of reflectors 8 through the plate 7 and then on opposite sides of the reflector 9, so that the opaque surfaces of the reflectors 8 and 9 together with the source 5 and the slit plate 6 form a means for producing a pair of beams of radiation $K_1$ and $K_2$ which diverge from each other at a relatively sharp acute angle in the manner indicated in FIG. 1.

A first radiation receiving means 10 is situated at the elevation of the reflectors 8 which form one optical means while a second radiation receiving means 11 is situated at the elevation of the reflector 9 which forms a second optical means, and in this way radiation received by the reflecting surfaces of the reflectors 8 and 9 will be reflected to the pair of receiving means 10 and 11 in a manner described in greater detail below.

The line which bisects the diverging angle between the diverging beams $K_1$ and $K_2$ intersects the optical axis at a right angle, and at this point of intersection the optical axis has a semi-transparent reflector 12 extending thereacross at a 45° angle parallel to the planes in which the reflectors 8 and 9 are located. Between the semi-transparent reflector 12 which thus intersects and extends across the optical axis and the plate 7 is situated a cylinder lens 13 which acts as a converging lens and which has its cylinder axis parallel to the elongated gap or slit of the opaque plate 6. Thus, the cylinder lens 13 together with the semi-transparent reflector 12 form another optical means of the invention, and this optical means will bring the pair of beams of radiation $K_1$ and $K_2$ into coincidence at the focal plane of the objective means 3.

The radiation derived from the source 5 has physical properties different from those of the light provided by the projection lamp 1. For example, as indicated above, the source 5 can provide an infra-red radiation, while the infra-red portion of the light issuing from the lamp 1 can be held back by the condenser assembly 2. In this case the beam receiving means 10 and 11 have the construction of radiation cells which are sensitive to infra-red.

The above-described structure operates as follows:

The radiation which travels through the slit of the plate 6 is formed by the opaque surfaces of the reflectors 8 and 9 into the pair of radiation beams $K_1$ and $K_2$ which are required to produce the controls of the invention. These control beams are brought together by way of the cylinder lens 13 and the reflector 12, by the construction of the elements 12 and 13 as well as their arrangement with respect to each other and the other components, into sharp coincidence in a single plane which coincides with the focal plane B, so that the optical means 12, 13 causes the beams $K_1$ and $K_2$ to intersect at the focal plane B. In the event that the slide 4 is situated in the focal plane B, so that the projection plane and the focal plane are in coincidence, then the radiation beams $K_1$ and $K_2$ will be reflected back along a pair of paths coinciding with their initial paths. Thus, the beam $K_1$ will be reflected back along the path taken by the beam $K_2$, and the beam $K_2$ will be reflected back along the path taken by the beam $K_1$. Therefore, the reflecting surfaces of the reflectors 8 and 9 will in this case remain unilluminated by the beams of radiation and there will be no reflecting of any parts of these beams to the radiation receiving means 10 or 11.

Assuming now that the projector is not properly focused, as can happen by an unforeseen displacement of the slide-carrier or by curving or other deformation of the slide due to heating thereof, then, for example, the projection plane may be improperly situated to the right, as viewed in FIG. 1, at the location 4' which indicates at an exaggerated scale a condition where the projection plane is improperly situated between the focal plane and the objective means 3. In this case the radiation beams $K_1$ and $K_2$ will be reflected by the slide back along a given return path before the beams of radiation reach the focal plane B. The reflected beams of radiation will return along the path $K_1'$ and $K_2'$ indicated in dotted lines. When they reach the semi-transparent reflector 12, through which the light from the lamp 1 can freely pass, the reflected radiation beams are directed back through the lens 13 and will in this case be received by the reflecting surface of the optical means 9 which thus directs the beam of radiation to the receiving means 11.

On the other hand, if the lack of focus is such that the focal plane B is situated between the projection plane and the objective means 3, then the slide will be situated, for example, at the location 4″ shown in a dot-dash line in FIG. 1 on an exaggerated scale, and in this case reflection of the beams of radiation $K_1$ and $K_2$ does not occur until after the beams have passed through the focal plane B. In this case the slide will reflect the beams of radiation back along a different return path $K_1''$ and $K_2''$. This return path causes the reflected beams of radiation to be directed by the reflector 12 to the pair of outer reflectors 8 which form an optical means directing these reflected radiation beams to the other radition receiving means 10. The return paths $K_1''$ and $K_2''$ are indicated in dot-dash lines in FIG. 1. While the cases have been described where the projection and focal planes are out of coincidence in one direction or the other, it is to be noted that similar effects are achieved when the slide 4 assumes an undesirable curvature due to heat, in which case the tangential plane of the slide shifts out of coincidence with the focal plane, so that in this case also one or the other of the radiation receiving means 10 and 11 will receive radiation.

The pair of radiation receiving means 10 and 11 control an unillustrated adjusting means in such a way that depending upon which one of the pair of radiation receiving means is energized an adjustment will be carried out in a direction which will bring the projection plane and focal plane back into coincidence so that the slide will be accurately situated at the focal plane B.

FIG. 2 illustrates one possible embodiment of a practical construction according to the present invention. The projector 15 of FIG. 2 is provided with a structure built according to the principles described above in connection with FIG. 1. Those parts shown in FIG. 2 which correspond to components of FIG. 1 are indicated with the same reference characters. The components 5–11 and 13 are all carried by a common supporting structure 16 which is longitudinally shiftable in the housing 17 of the projector, in a direction parallel to the optical axis. For this purpose suitable ball-bearing elements 18 are received in longitudinal tracks at the underside of the support 16 and are themselves guides in longitudinal grooves so that in this way the support 16 and all of the structure carried thereby can move freely back and forth along the optical axis.

The parts 5–11 and 13 are carried by a housing 19 which is mounted on the support 16, and one wall of this housing is formed with the slit 6 corresponding to the slit of the plate 6 of FIG. 1. The other end of the housing 19 accommodates an infra-red filter 20 which closes this other end of the housing 19 and which is situated just in front of the cylinder lens 13. The support 16 includes an upwardly directed extension provided with a sleeve 16a surrounding and carrying the objective means 3, so that in this embodiment the objective means 3 is adjustable along the optical axis together with the entire assembly carried by the housing 19 on the support 16. The embodiment of FIG. 2 includes an additional reflector 14 which directs the beams of radiation to the semi-transparent reflector 12 of FIG. 2.

The adjusting structure of FIG. 2 includes a motor 21 controlled by the radiation receiving means 10, 11. This motor 21 is carried at a fixed location by the housing 17 and includes a rotary eccentric pin 22 received in an elongated slot 23 formed in a guide lug 24 which is fixed to and projects forwardly from part of the supporting structure 16. Therefore, depending upon the direction of rotation of the motor 21 the pin 22 will turn in one direction or the other to displace the support 16 and all of the structure carried thereby in one direction or the other parallel to the optical axis, and in this way an automatic adjustment of the objective 3 will be provided. In this way the structure will operate automatically to bring the projection plane and the focal plane into coincidence. It is to be noted that in the case of FIG. 2 it is the objective means 3 together with its focal plane which is adjusted, whereas with the embodiment of FIG. 1 the projection plane was adjusted with respect to the focal plane.

One possible electrical control structure for bringing about the automatic actuation of the motor 21 is illustrated in FIG. 3. The pair of radiation receivers 10 and 11 are in the form of photosensitive resistors situated in a bridge circuit in which the motor 21 is located. The circuit includes resistors 25 and resistors 26 which are of the same fixed magnitude, and in addition the circuit includes a pair of transistors 27 and 28 which have an inverse relationship with respect to each other and which act as amplifiers. A source of potential U is provided for the circuit as indicated.

Assuming that no radiation is received by the pair of photosensitive resistors 10 and 11, then equilibrium prevails in the bridge circuit and the motor 21 is unenergized. On the other hand if one of the photosensitive resistors receives radiation, then the balance of the circuit is disturbed and the motor 21 is energized. The motor 21 will then bring about adjustment of the support 16, in the manner described above, until there again is no radiation received by either of the photosensitive resistors, at which time the motor 21 stops operating and the projector is accurately focused.

Of course, the invention is not limited to all of the details shown in the drawing and described above. For example, the pair of radiation beams $K_1$ and $K_2$ can be derived from separate sources of radiation. It is also possible to provide reflectors 8 and 9 which are units separate from each other instead of interconnected to each other through the common plate 7. Moreover, the structure of the invention can be used with a motion picture projector, in which case instead of a slide 4 a strip of motion picture film is used. Furthermore, certain components of the combination described above and shown in the drawings can be used in other combinations.

It is to be noted that with the structure of the invention, except for the semi-transparent reflector 12 all of the structure which brings about the automatic focusing is situated on one side of the optical axis, so that in this way an extremely compact structure can be provided. Moreover, it will be noted that with the structure of the invention the projector is properly focused when the radiation receiving means 10 and 11 do not receive any radiation, so that with the structure of the invention it is only when these receiving means receive radiation that the automatic focusing structure is required to respond. In this way it is possible to use radiation receiving structures which do not need to distinguish between one type of received radiation and another type of received radiation. They are only required to distinguish between receiving radiation and not receiving radiation, so that the structure operates very reliably while at the same time being quite simple and sacrificing no accuracy whatsoever.

Moreover, the arrangement of the pair of reflectors 8 on the outside of the pair of diverging beams of radiation will enable the entire reflected beams of radiation, in the one case of lack of coincidence between the projection plane and the focal plane, to be received and reflected to the radiation receiving means 10, so that a considerable source of radiation energy and thus a large control force is available. Moreover, the construction where the reflectors 8 and 9 are carried by the opposed faces of the single plate 7 provides an extermely compact simple assembly.

The cylinder lens 13 brings about coincidence of the pair of radiation beams $K_1$ and $K_2$ at the focal plane in the form of a single sharp line, derived initially from the slit of the opaque plate 6 of FIG. 1, so that in this way an extremely uniform radiation intensity throughout the entire depth of each control beam of radiation is assured, thus providing a very high degree of accuracy in the automatic adjustment.

Of course, the arrangement of the semi-transparent reflector 12 in a position extending across the optical axis also contributes to the compactness of the entire assembly.

Although the structure of the invention is easily adapted to the particular requirements of a given projector, as is apparent from the comparison of FIGS. 1 and FIG. 2, nevertheless a particularly superior construction is achieved with an arrangement such as that of FIG. 1 where the line which bisects the angle of divergence between the beams $K_1$ and $K_2$ perpendicularly intersects the optical axis while the plate 7 and the semi-transparent reflector 12 are situated in planes which respectively make angles of 45° with respect to the optical axis.

What is claimed is:

1. In a photographic projector, objective means for projecting a sharp image from a slide situated at a projection plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam-receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence, so as to focus the projector automatically, said pair of additional optical means respectively include one reflector situated between the diverging beams of radiation and at least one additional reflector situated beside and outside of the diverging beams of radiation.

2. In a photographic projector, objective means for projecting a sharp image from a slide situated at a projection plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence, so as to focus the projector automatically, and one of said pair of additional optical means includes a reflector situated between the diverging beams of radiation and the other of said pair of additional optical means includes a pair of reflectors respectively situated outside of and beside the pair of diverging beams of radiation.

3. In a photographic projector, objective means for projecting a sharp image from a slide situated at a projection plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence, so as to focus the projector automatically, said first optical means including a reflector extending across the optical axis of said objective means.

4. In a photographic projector, objective means for projecting a sharp image from a slide situated at a projection plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence, so as to focus the projector automatically, and a plate having a pair of opposed parallel flat surfaces carries said pair of additional optical means, and said pair of additional optical means including, respectively, one reflector carried by one fact of said plate between said pair of diverging beams of radiation and at least one additional reflector carried by an opposed face of said plate outside of and beside the diverging means of radiation.

5. In a photographic projector, objective means for projecting a sharp image from a slide situated at a projection plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence, so as to focus the projector automatically, said radiation beam producing means including a source of radiation, a plate formed with a gap through which the radiation travels from said source, a second plate made of a material through which the radiation freely flows, said second plate having a pair of opposed flat faces and carrying at said flat faces reflectors having opaque surfaces directed toward and reflecting surfaces directed away from said source, said reflectors including a pair of reflectors at that face of said second plate which is nearest to said source and defining between themselves a gap which receives the radiation from the gap of said first-mentioned plate and a third reflector situated at the opposed face of said second plate, which is directed away from said source, in the path of radiation flowing between said pair of reflectors on said face of said second plate which is directed toward said source, so that said reflectors cooperate to provide a pair of diverging beams between which said reflector on said face of said second plate directed away from said source is located and outside of which said reflectors on said face of said second plate directed toward said source are located, said first optical means including a cylinder lens situated in the path of said diverging beams and having an axis parallel to the gap of said first-mentioned plate and said first optical means further including a reflector extending across the optical axis of said objective means, receiving the beams of radiation from said cylinder lens, and reflecting them to the focal plane where they coincide.

6. In a photographic projector, objective means for projecting a sharp image from a slide situated at a projertion plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence, so as to focus the projector automatically, said first optical means including a semi-transparent reflector extending across the optical axis, said beams of radiation having properties different from the beam of light which passes through said objective means and a slide situated at said projection plane.

7. The combination of claim 6 and wherein a line bisecting the diverging angle of said pair of beams of radiation is perpendicular to the optical axis of said objective means, said semi-transparent reflector making an angle of 45° with respect to the optical axis and said pair of additional optical means respectively including a pair of reflectors which are also respectively situated in planes which make an angle of 45° with respect to the optical axis.

8. In a photographic projector, objective means for projecting a sharp image from a slide situated at a projection plane of the projector when the projection plane and a focal plane of said objective means are in coincidence, radiation beam producing means providing a pair of diverging beams of radiation which diverge from each other at a sharp, acute angle, first optical means situated in the path of said diverging beams of radiation and bringing them into coincidence at said focal plane, said beams of radiation being reflected back along their original paths by a slide at said projection plane when said projection plane and focal plane are in coincidence, said beams of radiation being reflected by a slide back along a first return path when said projection plane is situated between said focal plane and said objective means and along a second return path when said focal plane is situated between said projection plane and said objective means, a pair of beam receiving means and a pair of additional optical means respectively situated along said first and second return paths for directing the reflected beams to said pair of beam receiving means, respectively, so that when said planes are out of coincidence in one direction one of said beam receiving means will receive a reflected beam while when said planes are out of coincidence in an opposite direction the other of said beam receiving means will receive a reflected beam, whereas when said planes are in coincidence there will be no beam reflected to either of said pair of beam receiving means, and adjusting means operatively connected to said pair of beam receiving means for responding to whichever one thereof receives a reflected beam to bring said planes into coincidence so as to focus the projector automatically, said first optical means including a semi-transparent reflector extending across the optical axis, the remainder of said first optical means being situated on one side of said optical axis, and said radiation beam producing means, said pair of additional optical means, and said pair of beam receiving means all being situated also on said one side of said optical axis.

9. The combination of claim 8 and wherein said adjusting means is also situated on said one side of said optical axis.

References Cited

UNITED STATES PATENTS

| | | | |
|---|---|---|---|
| 3,264,935 | 8/1966 | Vose | 352—140 XR |
| 3,342,102 | 9/1967 | Maxon | 352—140 XR |

RICHARD M. SHEER, *Primary Examiner.*

NORTON ANSHER, *Assistant Examiner.*

U.S. Cl. X.R.

355—57; 353—101